US011741398B2

(12) United States Patent
 Moazzami et al.

(10) Patent No.: US 11,741,398 B2
(45) Date of Patent: Aug. 29, 2023

(54) MULTI-LAYERED MACHINE LEARNING SYSTEM TO SUPPORT ENSEMBLE LEARNING

(71) Applicant: Samsung Electronics Co., Ltd., Suwon-si (KR)

(72) Inventors: Mohammad M. Moazzami, San Jose, CA (US); Anil Yadav, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1169 days.

(21) Appl. No.: 16/217,362

(22) Filed: Dec. 12, 2018

(65) Prior Publication Data

US 2020/0042903 A1 Feb. 6, 2020

Related U.S. Application Data

(60) Provisional application No. 62/714,653, filed on Aug. 3, 2018.

(51) Int. Cl.
 *G06N 20/20* (2019.01)
(52) U.S. Cl.
 CPC .................................... *G06N 20/20* (2019.01)
(58) Field of Classification Search
 CPC ............................. G06N 20/20; G06N 7/005
 USPC .......................................................... 706/12
 See application file for complete search history.

(56) References Cited

U.S. PATENT DOCUMENTS

| 8,620,842 | B1 * | 12/2013 | Cormack ................ G06F 16/93 706/12 |
| 8,751,227 | B2 | 6/2014 | Koshinaka |
| 9,430,460 | B2 * | 8/2016 | Simard ................ H04L 1/0079 |
| 9,471,886 | B2 | 10/2016 | Tickoo et al. |
| 9,601,130 | B2 | 3/2017 | Le Roux et al. |
| 9,881,615 | B2 | 1/2018 | Choi et al. |

(Continued)

FOREIGN PATENT DOCUMENTS

| CN | 103035241 A | 4/2013 |
| WO | 2017059022 A1 | 4/2017 |

OTHER PUBLICATIONS

Burr Settles—"Active Learning Literature Survey"—2010—https://burrsettles.com/pub/settles.activelearning.pdf (Year: 2010).*

(Continued)

*Primary Examiner* — Viker A Lamardo

(57) ABSTRACT

A method includes providing input data to a plurality of base models to generate a plurality of intermediate outputs. The base models are non-linear in that different base models are specialized differently such that the different base models are complementary to one another. Each of the base models is generated using a different base classification algorithm in a multi-layered machine learning system. The method also includes processing the intermediate outputs using a fusion model to generate a final output associated with the input data. The fusion model is generated using a meta classification algorithm in the multi-layered machine learning system. The method may also include training the classification algorithms, where training data used by each of at least one of the base classification algorithms is selected based on an uncertainty associated with at least one other of the base classification algorithms.

20 Claims, 8 Drawing Sheets

(56) References Cited

U.S. PATENT DOCUMENTS

| | | | |
|---|---|---|---|
| 10,600,005 B2* | 3/2020 | Gunes | G06N 3/08 |
| 2004/0199384 A1 | 10/2004 | Hong | |
| 2009/0182696 A1* | 7/2009 | Menahem | G06N 20/20 |
| | | | 706/20 |
| 2013/0132311 A1* | 5/2013 | Liu | G06V 20/41 |
| | | | 706/12 |
| 2014/0279741 A1* | 9/2014 | Sow | G06N 20/00 |
| | | | 706/12 |
| 2016/0217387 A1 | 7/2016 | Okanohara et al. | |
| 2017/0140297 A1 | 5/2017 | Karumanchi et al. | |
| 2017/0140300 A1 | 5/2017 | Funakoshi et al. | |
| 2019/0155947 A1* | 5/2019 | Chu | G06N 20/00 |
| 2020/0012886 A1* | 1/2020 | Walters | G06F 9/54 |

OTHER PUBLICATIONS

Nasim Zolaktaf—"Active Learning"—2017—https://www.cs.ubc.ca/labs/lci/mlrg/slides/ACTIVE_LEARNING_MLRG.pdf (Year: 2017).*

International Search Report and Written Opinion of the International Searching Authority in connection with International Patent Application No. PCT/KR2019/008353 dated Oct. 17, 2019, 10 pages.

Bonissone, "Lazy Meta-Learning: Creating Customized Model Ensembles on Demand," IEEE World Congress on Computational Intelligence: Advances in Computational Intelligence, Jun. 2012, 26 pages.

* cited by examiner

MULTI-LAYERED MACHINE LEARNING SYSTEM TO SUPPORT ENSEMBLE LEARNING

CROSS-REFERENCE TO RELATED APPLICATION AND PRIORITY CLAIM

This application claims priority under 35 U.S.C. § 119(e) to U.S. Provisional Patent Application No. 62/714,653 filed on Aug. 3, 2018, which is hereby incorporated by reference in its entirety.

TECHNICAL FIELD

This disclosure relates generally to artificial intelligence systems. More specifically, this disclosure relates to a multi-layered machine learning system to support ensemble learning.

BACKGROUND

Various artificial intelligence systems supporting a number of machine learning techniques have been developed over the years. In order to place an artificial intelligence system into use, the artificial intelligence system is typically trained first using one or more sets of training data. The training data typically represents input data to be provided to the artificial intelligence system, and the input data can be labeled with known or expected outputs that should be generated by the artificial intelligence system based on the input data. If labeled training data is used, a machine learning algorithm typically attempts to find patterns or otherwise process the training data in order to determine how to map the training data to the known or expected outputs. The result of the training is typically a model that represents the patterns or other processing performed by the artificial intelligence system. Ideally, the model can then be placed into use, at which point the model is used to process additional input data (for which correct outputs are unknown ahead of time) and generate additional outputs.

SUMMARY

This disclosure provides a multi-layered machine learning system to support ensemble learning.

In a first embodiment, a method includes providing input data to a plurality of base models to generate a plurality of intermediate outputs. The base models are non-linear in that different base models are specialized differently such that the different base models are complementary to one another. Each of the base models is generated using a different base classification algorithm in a multi-layered machine learning system. The method also includes processing the intermediate outputs using a fusion model to generate a final output associated with the input data. The fusion model is generated using a meta classification algorithm in the multi-layered machine learning system.

In a second embodiment, an electronic device includes at least one memory and at least one processor coupled to the at least one memory. The at least one processor is configured to process input data using a plurality of base models to generate a plurality of intermediate outputs. The base models are non-linear in that different base models are specialized differently such that the different base models are complementary to one another. Each of the base models is generated using a different base classification algorithm in a multi-layered machine learning system. The at least one processor is also configured to process the intermediate outputs using a fusion model to generate a final output associated with the input data. The fusion model is generated using a meta classification algorithm in the multi-layered machine learning system.

In a third embodiment, a non-transitory computer readable medium contains computer readable program code that, when executed, causes an electronic device to process input data using a plurality of base models to generate a plurality of intermediate outputs. The base models are non-linear in that different base models are specialized differently such that the different base models are complementary to one another. Each of the base models is generated using a different base classification algorithm in a multi-layered machine learning system. The medium also contains computer readable program code that, when executed, causes the electronic device to process the intermediate outputs using a fusion model to generate a final output associated with the input data. The fusion model is generated using a meta classification algorithm in the multi-layered machine learning system.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B"

may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
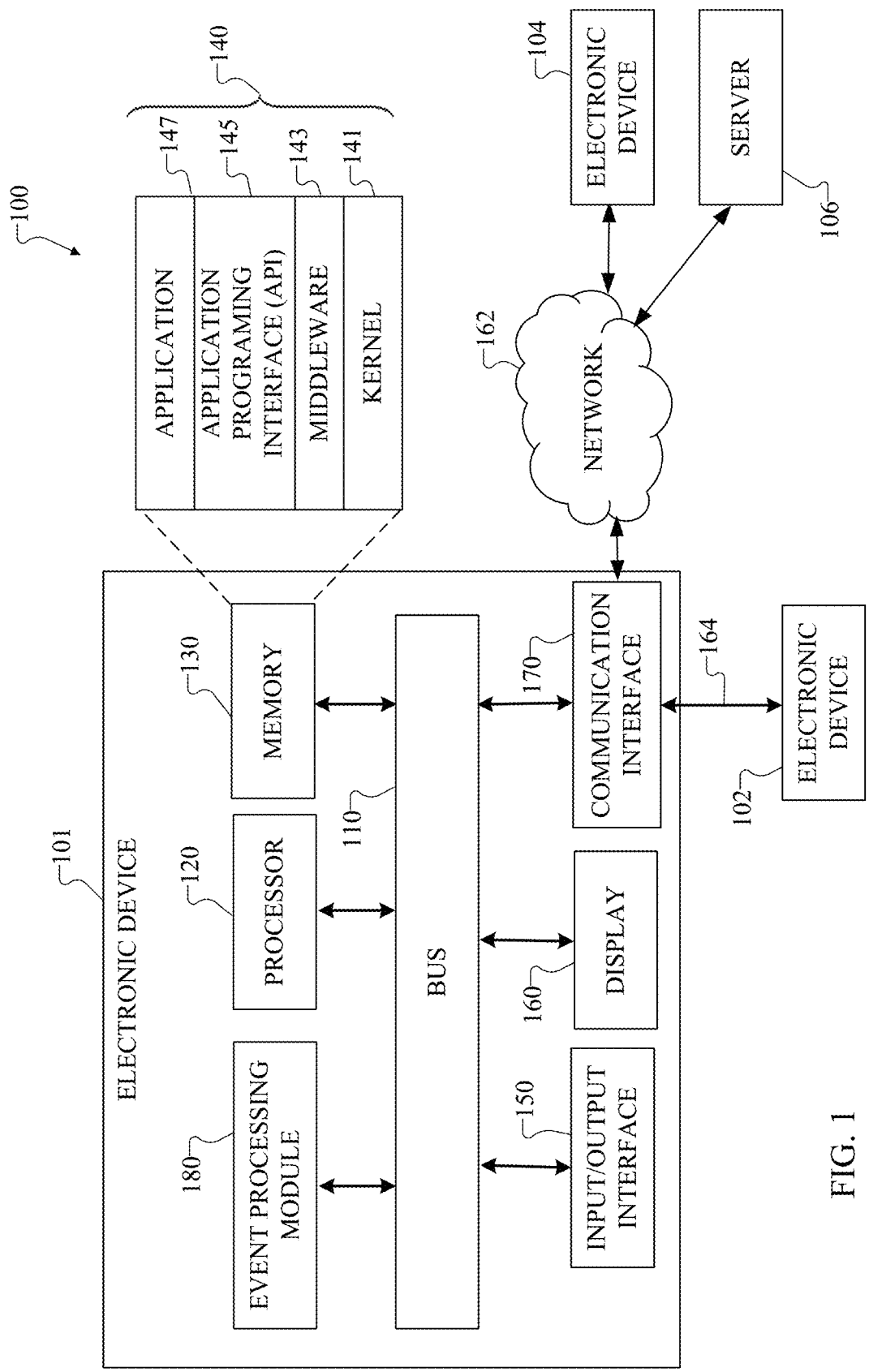
FIG. 1 illustrates an example network configuration in accordance with this disclosure.

FIGS. 1 through 6, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference numerals may be used to refer to the same or similar elements throughout the specification and the drawings.

As noted above, in order to train an artificial intelligence system, training data is typically provided to the artificial intelligence system. A machine learning algorithm then attempts to find patterns or otherwise process the training data, and a model can be generated that is then placed into use. In some instances, the machine learning algorithm can generate multiple models. For example, one approach known as "bagging" generates multiple similar models with high variance among the models, where outputs from the models can be averaged to reduce the variance. In another approach known as "boosting," multiple incremental models are built to decrease the models' bias while keeping the variance of the models small.

While these approaches can be effective in some cases, the overall quality of the training of an artificial intelligence system depends highly on the quality of the training data that is used. As a general rule, it may typically be assumed that more training data is better than less training data and that more labeled training data is better than more unlabeled training data. "Labeled" here means that the training data includes the known or expected outputs associated with the training inputs to an artificial intelligence system. It is also typically assumed that training data closer to real-use data is even better, and labeled real-use data is the best for training purposes. Unfortunately, if real-use data is available for an artificial intelligence system, that data is often not labeled. Moreover, labeling real-use data so that the data can be used for training purposes often requires time, money, and specialized expertise. This can be problematic in various industries where artificial intelligence models need to be updated over time (and often in short amounts of time) by capturing real-use data and generating new models that can then be deployed and placed into use. This is often needed so that the models that are deployed align with the actual usage of the artificial intelligence systems.

This disclosure provides techniques that help to automate the labeling of real-use data or other unlabeled data. These techniques support the use of "ensemble" modeling, which means multiple models can be generated and used to label data. These models include "base" models and a "fusion" model. The base models can be generated by base learners (such as base classifiers), and the fusion model can be generated by a meta learner (such as a meta classifier). The base learners are learning algorithms for the base models, and the meta learner is a learning algorithm for the fusion model.

As described in more detail below, the base models represent complementary models representing portions of the same problem space. Each base learner can generate a base model by learning some part of the overall problem space, but each base learner is unable to accurately address the entire problem space. For example, at least some of the base learners can receive training data that is selected based on the uncertainties associated with other base learners. Among other things, this helps to reduce or minimize mutual information between each pair of base learners. As a result, the collection of base models is said to form a "non-linear" representation of the problem space since the base models use different representations of portions of the problem space. The fusion model defines how intermediate outputs that are generated using the base models can be combined to produce a final output. Ideally, the fusion model can be used to generate the final output with improved accuracy and improved performance compared to use of individual base models.

In some embodiments, the base models are used to produce intermediate labels for real-use data or other unlabeled data, and the fusion model is used to produce final labels for the real-use data or other unlabeled data. For example, each base model could be used to classify a domain or intent of user utterances (phrases spoken by end users). As specific examples, in the voice recognition context, different domains may correspond to different applications or apps, such as music, photos, timer, calendar, email, and text message apps. Different intents may correspond to different functions in each of the applications or apps, such as searching, playing, pausing, stopping, or skipping music, searching or viewing photos, setting an alarm, creating a calendar event, or sending an email or text message. Other domains and intents would be associated with other artificial intelligence systems. The intermediate outputs produced using the base models can include so-called "noisy" labels identifying the domains or intents. The labels are noisy since the labels are of lower quality and may be subject to a relatively large amount of uncertainty. The final outputs produced using the fusion model are ideally more accurate labels identifying the domains or intents, meaning the final outputs are subject to a relatively smaller amount of uncertainty. In this way, the base models and the fusion model can be used to help produce labeled data from unlabeled data, and that labeled data can then be used to train some other artificial intelligence system or perform other functions. This can help to save significant time, money, and effort in updating models that are in actual commercial use in artificial intelligence systems.

FIG. 1 illustrates an example network configuration 100 in accordance with this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 133 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external device.

The display 160 may include, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, an I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
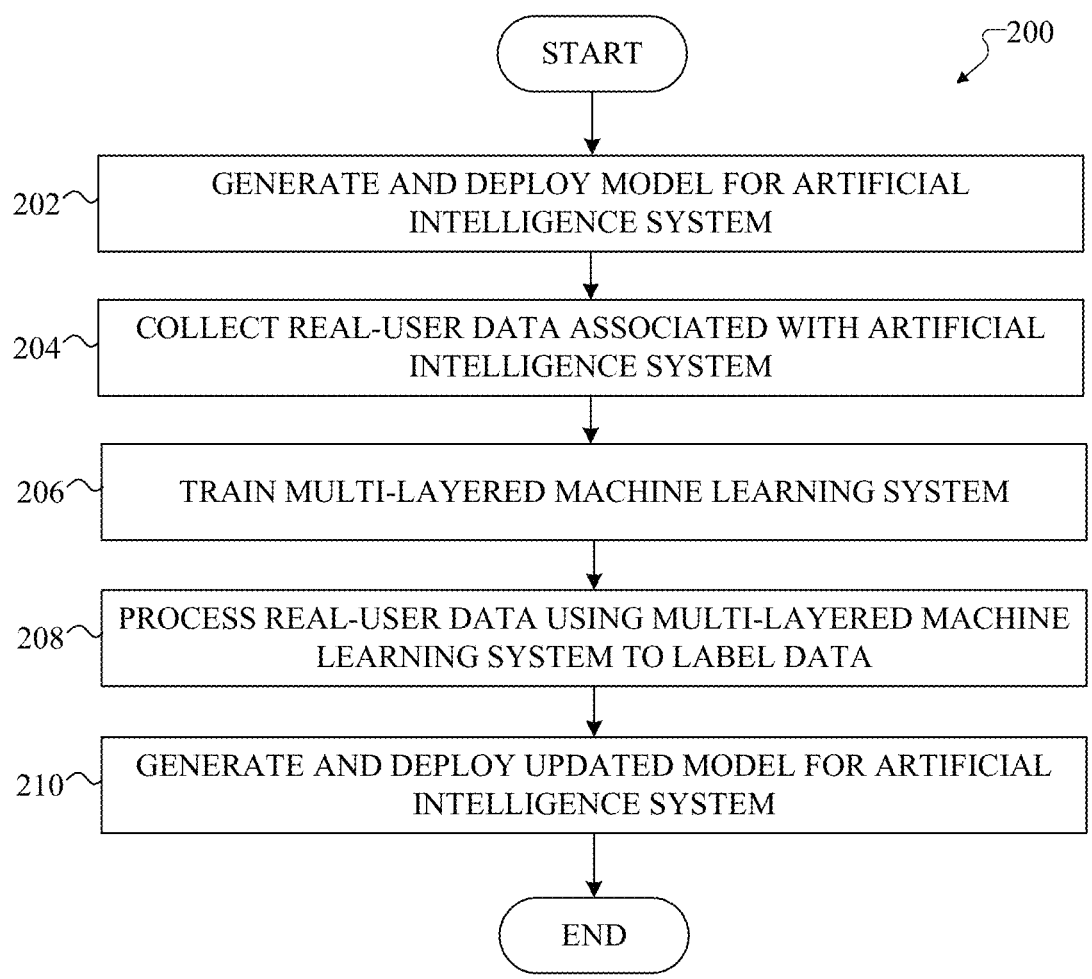
FIG. 2 illustrates an example method for deploying improved models for an artificial intelligence system using a multi-layered machine learning system in accordance with this disclosure.

FIG. 2 illustrates an example method 200 for deploying improved models for an artificial intelligence system using a multi-layered machine learning system in accordance with this disclosure. In particular, FIG. 2 illustrates how a multi-layered machine learning system can be used in conjunction with another artificial intelligence system to support the generation of improved models for the other artificial intelligence system. For ease of explanation, the method 200 may be descried as being performed using one or more electronic devices (such as an electronic device 101, 102, or 104 or server 106) in FIG. 1. However, the method 200 may be performed using any suitable device(s) that operate in any suitable system(s).

As shown in FIG. 2, at least one model for an artificial intelligence system is generated and deployed at step 202. There are numerous artificial intelligence systems and numerous techniques for training artificial intelligence systems to generate models known in the art, and it is expected that much larger numbers of artificial intelligence systems and training techniques will be developed over the coming years. The artificial intelligence system here could support any desired functionality. Examples of artificial intelligence systems can include systems used to analyze user utterances to identify the meanings of the utterances or to perform contextualized searches. Other examples of artificial intelligence systems can include systems used to analyze image frames captured by cameras to perform image processing or image recognition. Still other examples of artificial intelligence systems can include expert systems, such as those used in medical, financial, or legal applications. These examples are for illustration only, and any other suitable artificial intelligence system can be used here.

In general, it is often the case that an artificial intelligence system placed into commercial use includes at least one model that is generated based on assumptions about the data that will be provided to the model during actual use. Such a model is said to be "biased" or "specialized," and the goal of the training of the artificial intelligence system is often to bias or specialize the model using training data that has the same general distribution as the data that is expected to be provided during actual use. Ideally, this type of training prepares the model for the specific domains or intents for which the artificial intelligence system is being deployed. Once placed into commercial use, however, the real-use data that is provided to the artificial intelligence system may not match how the model was specialized. For instance, the real-use data may be directed more towards domains or intents for which the model was not specialized (or for which the model was specialized to a smaller extent compared to other domains or intents). Because of this, the model that was originally deployed for use may not be as effective as it could be in analyzing data and generating outputs. Thus, real-use data associated with the artificial intelligence system can be collected at step 204. This can include, for example, an electronic device (such as the electronic device 101, 102, or 104 or server 106) collecting information identifying the data that is actually being input into the artificial intelligence system over time during commercial use of the artificial intelligence system. The real-use data can be collected for any suitable period of time, such as one or more days, weeks, or months.

Ideally, the collected real-use data could then be used to generate at least one additional (and more accurate) model for the artificial intelligence system. However, one problem with the collected real-use data is that it is not labeled, meaning the collected real-use data may identify the inputs that were provided to the artificial intelligence system but lack an identification of the correct outputs that should have been generated by the artificial intelligence system. In prior approaches, the collected real-use data may have to be examined and labeled manually, which is time-consuming and expensive. As a result, this could delay the retraining of the artificial intelligence system and deployment of the improved model.

To help overcome this problem or other problems involving unlabeled data, a multi-layered machine learning system is trained at step 206 and used to process the real-use data in order to label that data at step 208. This could include, for example, an electronic device (such as the electronic device 101, 102, or 104 or server 106) implementing a multi-layered machine learning system that includes multiple base learners and a meta learner. This could also include the electronic device performing a training process described below using the base learners and the meta learner to generate base and fusion models, which is done using training data that is supplied to the multi-layered machine learning system. This could further include the electronic device performing an execution or inferencing process described below to process and label the real-use data using the base and fusion models.

As described in more detail below, the multi-layered machine learning system is constructed by recognizing that the definition of a problem space can be improved by defining multiple non-linear and complementary base models of the problem space and defining a fusion model for combining the outputs generated using the base models. In this example, the problem space involves determining how to accept real-use data or other unlabeled data and generate labels for the unlabeled data. This real-use data is typically associated with one or more specific domains and multiple intents. Thus, the multi-layered machine learning system described below supports the use of multiple base learners that can generate non-linear and complementary base models of the problem space. In some embodiments, at least one base learner can receive training data selected based on uncertainties associated with at least one other base learner. This can help to reduce or minimize mutual information between the base learners and increase or maximize information gain obtained by the base models. The fusion model defines how intermediate outputs generated using the base models can be combined to produce a final output. Once the base and fusion models are defined in the training process, the base and fusion models can be used to label real-use data.

The labeled real-use data can be used to generate and deploy at least one updated model for the artificial intelligence system at step 210. Again, there are numerous artificial intelligence systems and numerous techniques for training artificial intelligence systems to generate models known in the art, and it is expected that much larger numbers of artificial intelligence systems and training techniques will be developed over the coming years. The same training technique can be used in steps 202 and 210, or different training techniques can be used in steps 202 and 210.

Although FIG. 2 illustrates one example of a method 200 for deploying improved models for an artificial intelligence system using a multi-layered machine learning system, various changes may be made to FIG. 2. For example, while shown as a series of steps, various steps in FIG. 2 could overlap, occur in parallel, occur in a different order, or occur any number of times. As a particular example, steps 204-210 of the method 200 may be repeated any number of times as real-use data is collected and diverges from the specialization of the model that is currently in use. Also, the multi-layered machine learning system described in this patent document could be used in any other suitable manner.

Figure 3:
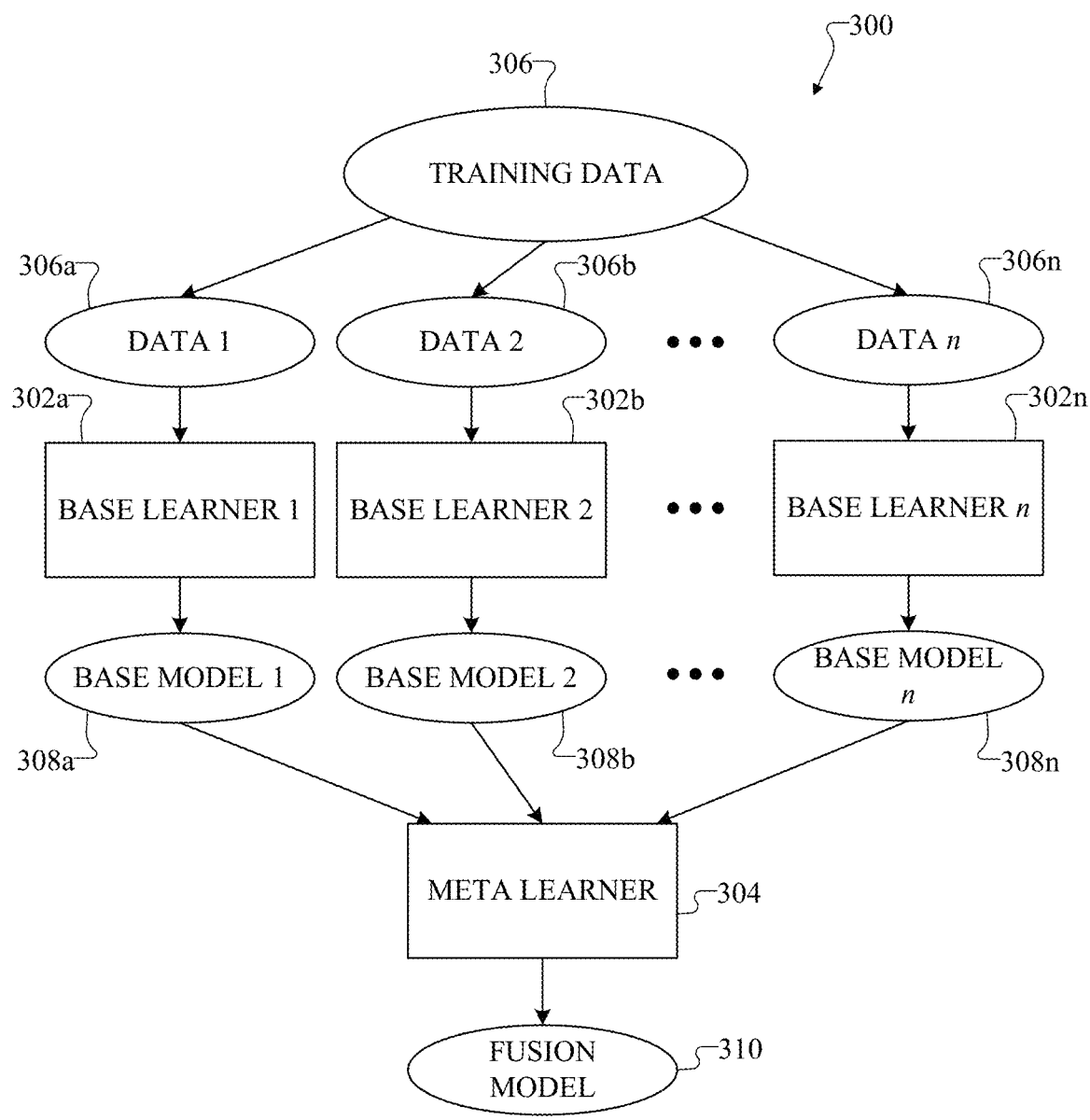
FIG. 3 illustrates an example training process for training a multi-layered machine learning system in accordance with this disclosure.

FIG. 3 illustrates an example training process 300 for training a multi-layered machine learning system in accordance with this disclosure. For ease of explanation, the training process 300 may be descried as being performed using one or more electronic devices (such as an electronic device 101, 102, or 104 or server 106) in FIG. 1. However, the training process 300 may be performed using any suitable device(s) that operate in any suitable system(s).

As shown in FIG. 3, the multi-layered machine learning system generally includes a collection of base learners 302a-302n and a meta learner 304. Each base learner 302a-302n generally represents or implements a machine learning algorithm (referred to as a base classification algorithm) that accepts at least part of a collection of training data 306 and generates a base model 308a-308n, respectively. The meta learner 304 generally represents or implements a machine learning algorithm (referred to as a meta classification algorithm) that accepts outputs from the base learners 302a-302n or the base models 308a-308n and generates a fusion model 310.

As noted above, the base learners 302a-302n are designed and implemented to produce non-linear and complementary base models 308a-308n representing a problem space. In some embodiments, the base learners 302a-302n implement different machine learning techniques, which lead to the generation of different types of base models 308a-308n. Various types of learners supporting different machine learning techniques are known in the art, and additional learners and machine learning techniques are sure to be developed over time. Any suitable learners and machine learning techniques can be used by or as the base learners 302a-302n to process training data and generate base models 308a-308n. Example types of learners that can be used here include support vector machine (SVM) learners, k-nearest neighbor (kNN) learners, simple perceptron learners, Gaussian quadratic learners, linear Bayes learners, and multilayer neural network learners or other deep learning learners. Even if different types of learners are given the exact same training data having two distinct and clearly-labeled datasets, the different learners could identify different boundaries separating those two datasets. As a result, using different types of learners as the base learners 302a-302n allows different types of base models 308a-308n to be generated using the training data 306.

In some embodiments, the base learners 302a-302n can also or alternatively use different subsets 306a-306n of training data 306, which again leads to the generation of different types of base models 308a-308n. When the different subsets 306a-306n of training data 306 are selected appropriately, this may also allow the base models 308a-308n to capture an improved or maximum amount of information from the training data 306. This can generally involve identifying the most informative samples from the training data 306 for each of the base learners 302a-302n and then providing those samples (in the form of the subsets 306a-306n) to the base learners 302a-302n for use. A discussion of example techniques for identifying the most informative samples of training data for the base learners 302a-302n is provided below.

In either of these approaches, the base learners 302a-302n allow a learning problem to be attacked with different types of base models 308a-308n, so the base learners 302a-302n are able to learn part of an overall problem but not the whole problem. Another way to state this is that the base learners 302a-302n are used to learn multiple alternative definitions of the same concept (the same problem space), so again each base learner 302a-302n is able to learn part but not all of an overall problem. The parts of the problem learned by the base learners 302a-302n may overlap somewhat, and ideally the parts of the problem learned by the base learners 302a-302n cover the entire problem space.

As noted above, the meta learner 304 is designed and implemented to use the outputs generated using the base models 308a-308n (which are called "intermediate outputs") to produce the fusion model 310. The fusion model 310 identifies how the intermediate outputs can be combined to produce a final output. The intermediate outputs are noisy since the intermediate outputs generated using different base models 308a-308n may not be consistent with one another. The meta learner 304 uses the intermediate outputs generated using the training data 306 and learns how to map the intermediate outputs to the known or expected labels of the training data 306 to generate the fusion model 310. The fusion model 310 can then be used to combine intermediate outputs generated using, for example, unlabeled real-use data or other unlabeled data in order to produce final labels for the unlabeled data.

The meta learner 304 can use any suitable technique to combine the intermediate outputs, such as in any suitable linear or non-linear manner. Example types of techniques that could be used by the meta learner 304 to combine intermediate outputs include majority voting, weighted voting, majority voting plus goodness factoring, and weighted voting plus goodness factoring. In majority voting, the meta learner 304 determines whether a particular intermediate output is generated most often by the base models 308a-308n. In weighted voting, the meta learner 304 determines whether a particular intermediate output is generated most often by the base models 308a-308n, where it is assumed that certain outputs are more likely than others. In majority voting plus goodness factoring, the meta learner 304 normalizes the intermediate outputs using "goodness" factors and then determines whether a particular normalized intermediate output is generated most often by the base models 308a-308n. In weighted voting plus goodness factoring, the meta learner 304 normalizes the intermediate outputs using the goodness factors and then determines whether a particular normalized intermediate output is generated most often by the base models 308a-308n, where it is assumed that certain outputs are more likely than others.

In two of the approaches described above, the goodness factor of a base model 308a-308n generally represents an overall measure of how well the base model 308a-308n is operating. One example technique for identifying the goodness factor of a base model 308a-308n is to apply a number of test datasets to the base model 308a-308n, where the test datasets include known or expected outputs and are used to measure different aspects of the performance of the base model 308a-308n. The average value of the performance of the base model 308a-308n over the test datasets can then be averaged to identify the goodness factor for that base model 308a-308n. This process can be performed over all of the base models 308a-308n to identify the goodness factors for all of the base model 308a-308n. Later, when processing unlabeled real-use data or other unlabeled data, the meta learner 304 can use the goodness factors to weight the intermediate outputs generated using the base models 308a-308n. Essentially, this allows the meta learner 304 to consider the historic or prior performance of the base models 308a-308n, and the goodness factors help to normalize or regularize the intermediate outputs to make sure that the base models 308a-308n are not over-fitted to particular data.

Figure 4:
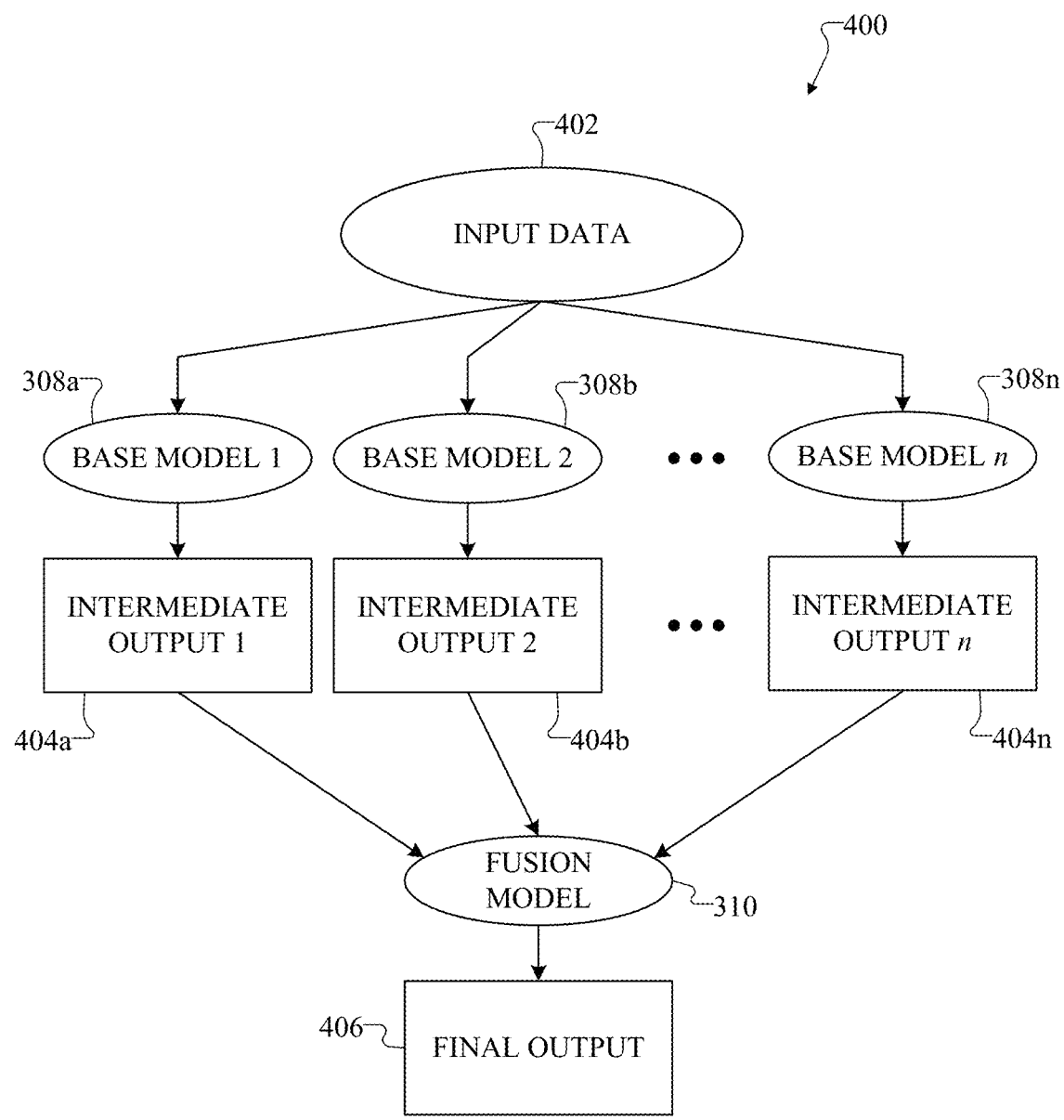
FIG. 4 illustrates an example execution or inferencing process for using a multi-layered machine learning system in accordance with this disclosure.

FIG. 4 illustrates an example execution or inferencing process 400 for using a multi-layered machine learning system in accordance with this disclosure. In particular, FIG. 4 illustrates how the base models 308a-308n and the fusion model 310 generated earlier can be used. For ease of explanation, the execution or inferencing process 400 may be descried as being performed using one or more electronic devices (such as an electronic device 101, 102, or 104 or server 106) in FIG. 1. However, the execution or inferencing process 400 may be performed using any suitable device(s) that operate in any suitable system(s).

As shown in FIG. 4, input data 402 is provided to the base models 308a-308n, which generate intermediate outputs 404a-404n. The intermediate outputs 404a-404n are provided to the fusion model 310, which combines the intermediate outputs 404a-404n to generate one or more final outputs 406. The intermediate outputs 404a-404n represent base predictions of the one or more final outputs 406, but the base predictions can vary between the base models 308a-308n due to the non-linear and complementary nature of the base models 308a-308n. For example, when used to label unlabeled input data 402, the intermediate outputs 404a-404n can represent base predictions of what the labels should be, while the final outputs 406 represent final predictions of what the labels should be.

The input data 402 represents any suitable input data to be processed using the base models 308a-308n and the fusion model 310. For example, the input data 402 could represent real-use data associated with an artificial intelligence system that has been placed into commercial use, such as real-use data associated with user utterances, image frames, or medical, financial, or legal applications. The intermediate outputs 404a-404n represents any suitable output values generated by base models, and the final output(s) 406 represent(s) any suitable output value(s) generated by a fusion model. For instance, the intermediate outputs 404a-404n could represent noisy labels to be applied to the input data 402, and the final outputs 406 could represent at least one more-accurate label to be applied to the input data 402. The final outputs 406 can then be used in any suitable manner, such as to retrain the artificial intelligence system using the now-labeled real-use data.

One specific (and non-limiting) way of expressing the operation of the base learners 302a-302n and the meta learner 304 is as follows. During the training process 300, the base learners 302a-302n respectively receive training data $x^{(1)}$-$x^{(n)}$ and respectively generate noisy outputs $\tilde{y}^{(1)}$-$\tilde{y}^{(n)}$. For the $i^{th}$ training data $x^{(i)}$, the associated base learner generates a noisy output $\tilde{y}_{(i)}$, where $\tilde{y}^{(i)} \in \{1, \ldots, L\}$ and where $1, \ldots, L$ represents the collection of classes (such as different labels) that could be applied to the training data $x_{(i)}$. The outputs of the base learners 302a-302n therefore form a noisy labeled dataset $D_N = \{(x^{(1)}, \tilde{y}^{(1)}), \ldots, (x^{(n)}, \tilde{y}^{(n)})\}$.

The meta learner 304 can model the output noise for each of the base learners 302a-302n as follows:

$$P(\tilde{y}|x,y) = \tilde{y}^T N y \qquad (1)$$

Here, $\tilde{y}$ represents the noisy output for the base learner, y is the "grand truth" (meaning the correct output), x is the training data in a feature space, and P( ) is a probability function. Also, N is the noise matrix, where each entry $N_{jk}$ in the noise matrix denotes the noise or uncertainty between labels j and k. The following values can be assigned to the noise matrix in different circumstances.

(1) When a label is noise-free (meaning $\tilde{y}=y$), N=I, where I is the identity matrix;

(2) When a label suffers from pure random noise (meaning $\tilde{y}$ can take any possible value other than y and the chance of having a wrong value for y is equal across all other labels), $$N_{i,j} = \frac{1}{L-1}(U-1),$$

where U is the unit matrix and I is the identity matrix; and (3) When a label suffers from confusing noise (meaning $\tilde{y}$ can take one of one or more values that are confused with y more often and the chance of having a wrong value for y is not equal across all other labels), N=C, where C is a stochastic confusion matrix specific to each domain that can be learned or pre-defined as a prior context for each domain. More complex C matrices would indicate more complex domain intents. Different values $C_{jk}$ in the stochastic confusion matrix identify the probability of mixing labels j and k with each other.

The meta learner 304 can therefore use, as its input feature vector, the noisy outputs $\tilde{y}^{(1)}$-$\tilde{y}^{(n)}$ and the noise matrix N. Using this feature vector, the meta learner 304 can build the fusion model 310. As noted above, the meta learner 304 can build the fusion model 310 using any of the techniques described above (majority voting, weighted voting, majority voting plus goodness factoring, or weighted voting plus goodness factoring) or other suitable techniques.

The same type of notations can be used when discussing example techniques for selecting the subsets 306a-306n of training data 306 to be provided to the base learners 302a-302n. As noted above, this can generally involve identifying the most informative samples from the training data 306 for each of the base learners 302a-302n and then providing those samples (in the form of the subsets 306a-306n) to the base learners 302a-302n for use. Training data samples can generally be viewed as being "informative" if they decrease the uncertainty associated with the resulting base model by the largest amount. Mathematically, this can be expressed as:

$$x^* = \arg\max(H(M) - H(M|x)) \quad (2)$$

Here, x represents the collection of training data 306, x* represents the most informative samples of the training data 306 for a specific base model M, and H( ) represents a measure of uncertainty (noise) for the model M (which can be determined using information theory).

From this, it is possible to select or create the training samples for the base learners 302a-302n such that each subsequent base learner 302b-302n is trained on the weaknesses of the preceding base learner(s). As a result, the base models 308a-308n that are generated by the base learners 302a-302n are complementary, meaning each base model or group of base models can be generated using informative training samples in areas where the other base models or groups of base models are not. There are various sampling strategies that could be used here to select or create the training samples for the base learners 302b-302n based on the uncertainty (noise) so that at least some of the base models 308b-308n are generated using training samples about which the other base models are the most uncertain. Since no base model may be generated prior to generation of the first base model 308a by the first base learner 302a, the first base model 308a is generated without reference to the uncertainty of any prior base model. Three examples of sampling strategies that could be used here include the following.

(1) Least-confident sampling: For each of the base learners, its input training data is defined as:

$$x^* = \underset{x,M}{\operatorname{argmax}}(1 - P_M(\tilde{y}|x)) \quad (3)$$

where x represents the collection of training data 306, ỹ represents the most-probable output of the base learner for the training data x over the base model M, x* represents the most informative samples of the training data 306 for the base model M, and $P_M(\ )$ is a probability function for the base model M.

(2) Least-reliable sampling: For each of the base learners, its input training data is defined as:

$$x^* = \underset{x,M}{\operatorname{argmin}}(P_M(\tilde{y}_2|x) - P_M(\tilde{y}_1|x)) \quad (4)$$

where x represents the collection of training data 306, ỹ₁ and ỹ₂ represent the two most-probable outputs of the base learner for the training data x over the base model M, x* represents the most informative samples of the training data 306 for the base model M, and $P_M(\ )$ is a probability function for the base model M.

(3) Most output entropy: For each of the base learners, its input training data is defined as:

$$x^* = \underset{x,M}{\operatorname{argmin}}(P_M(\tilde{y}|x)\log P_M(\tilde{y}|x)) \quad (5)$$

where x represents the collection of training data 306, ỹ represents the most-probable output of the base learner for the training data x over the base model M, x* represents the most informative samples of the training data 306 for the base model M, and $P_M(\ )$ is a probability function for the base model M.

Ideally, using any of these approaches (or other suitable approaches), each base learner 302a-302n is trained using the training data for which the other base learners are weaker. As a result, individual base models 308a-308n or groups of base models 308a-308n are complementary to one another. This is because the training samples used by each base learner 302a-302n can be biased since the training samples do not necessarily reflect the distribution of the entire collection of training data 306. As a result, different base models 308a-308n or different groups of base models 308a-308n are built to be specialized to parts of the training data 306, so the base models 308a-308n are non-linear.

In some embodiments, in order to support the generation of non-linear and complementary base models 308a-308n, the base learners 302a-302n can operate sequentially rather than in parallel. For example, the base models 308a-308n (which are denoted $M_1$-$M_n$ below) can be generated in sequential order as follows:

$$M_1 \to M_2 \to M_3 \to \ldots \to M_n \quad (6)$$

Thus, each model $M_{i+1}$ can be generated after the prior model $M_i$. An objective function O can be defined for training the base learners 302a-302n against each other. The objective function O could be expressed as:

$$O = \min_D I(M_i; M_1, \ldots, M_{i-1}) \quad (7)$$

Here, $M_i$ represents the $i^{th}$ model of the $i^{th}$ base learner to be generated, and $M_1, \ldots, M_{i-1}$ represents the prior model(s) built in the sequence prior to the $i^{th}$ model. Also, D represents the set of data samples that are available for training the $i^{th}$ base learner, and I(x, y) represents mutual information between models or groups of models represented by x and y (which can be determined using information theory). In some embodiments, this objective function can be solved by determining the following:

$$S_i = a \times \arg\max_D H(S_1, \ldots, S_{i-1}) + (1-a) \times (D - U_{k=1}^i S_k) \quad (8)$$

$$w.r.t. D = U_{i=1}^n S_i \text{ and } a > 1 \quad (9)$$

Here, $S_i$ represents the training samples that the model M is trained on, and $S_1, \ldots, S_{i-1}$ and $S_k$ represent the training samples that the prior model(s) in the sequence was/were trained on. Again, note that model $M_1$ is trained in the sequence first, so it is not biased because there is no model trained before it (and the first model cannot be trained against the uncertainties of the non-existed prior model), which is why a>1 in this example. Also, D represents the set of training samples that are available for training and is therefore the union of all samples used for the training of all base learners 302a-302n. Equations (8) and (9) above essentially state that, for generating model $M_i$, choose the training samples for $S_i$ from D that minimize the mutual information between $S_i$ and the previously-generated model(s) $M_1$ through $M_{i-1}$, thereby making the models $M_1$ through $M_i$ commentary to each other over the entire training set. Note that in Equation (8), the left half of the equation refers to the information measurement of the training data 306 (which could be based on one of Equations (3)-(5) above), while the right half of the equation refers to other samples of training data (which could be artificially generated as described below).

As noted above, the fusion model 310 is used to combine the intermediate outputs 404a-404n from the base models 308a-308n during the execution or inferencing process 400. In some embodiments, the fusion model 310 can combine the intermediate outputs 404a-404n in the following manner:

$$P(y|x) = \Sigma_{k=1}^{n}(G_k \times P_k(y|x)) \quad (10)$$

Here, $P(y|x)$ represents a final output value, $P_k(y|x)$ represents the $k^{th}$ intermediate output value from the $k^{th}$ base model, and $G_k$ represents the goodness factor for the $k^{th}$ base model. Summing the weighted intermediate outputs 404a-404n in this manner can be done to generate a more accurate final output 406 using the intermediate outputs 404a-404n. Although not shown in Equation (10), if needed or desired, the sum of the values can be normalized to produce a final output 406 that is normalized to some scale, such as a value between zero and one (inclusive). As noted above, however, there are various techniques that the fusion model 310 can use to combine the intermediate outputs 404a-404n and generate a final output 406.

Although FIG. 3 illustrates one example of a training process 300 for training a multi-layered machine learning system and FIG. 4 illustrates one example of an execution or inferencing process 400 for using a multi-layered machine learning system, various changes may be made to FIGS. 3 and 4. For example, the multi-layered machine learning system may include any suitable number of base learners, such as two or more base learners, used to generate any suitable number of base models, such as two or more base models. Also, it is possible for multiple layers of base learners or base models and/or multiple layers of meta learners or fusion models to be used in the multi-layered machine learning system. In these types of implementations, for instance, it is possible for the second layer of the machine learning system to include multiple meta learners, which then act as base learners for a third layer of the machine learning system that includes additional meta learners. Thus, learners in one layer can receive data, generate associated models, and provide data to a subsequent layer of learners. The subsequent layer of learners can process the data, generate associated models, and provide additional data to another subsequent layer of learners. The last layer of the machine learning system may typically include a single learner that generates a final fusion model for the hierarchy. The resulting hierarchical arrangement of models can then be deployed for use in analyzing input data 402. This type of architecture is easily scalable and can be expanded to any number of desired levels of learners/models. In addition, while the base learners 302a-302n and the meta learner 304 are shown here as being separate components, at least some of the base learners 302a-302n and the meta learner 304 can be implemented on the same physical component. As a particular example, the classification algorithms of the base learners 302a-302n and the meta learner 304 could be executed using the same electronic device, such as the electronic device 101, 102, 104 or server 106.

Figure 5A:
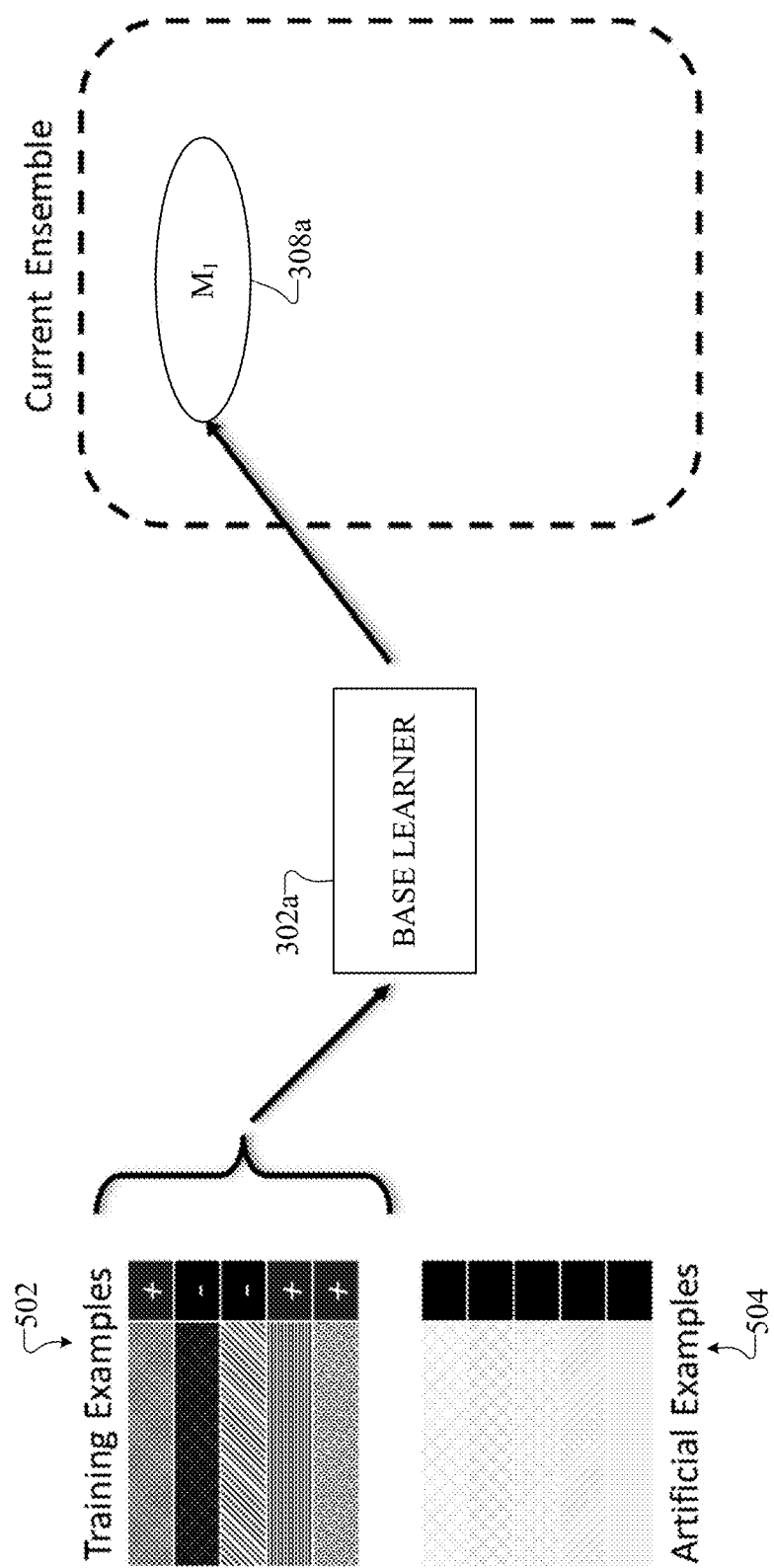
FIGS. 5A, 5B, and 5C illustrate a portion of a specific example training process for training a multi-layered machine learning system in accordance with this disclosure.
Figure 5B:
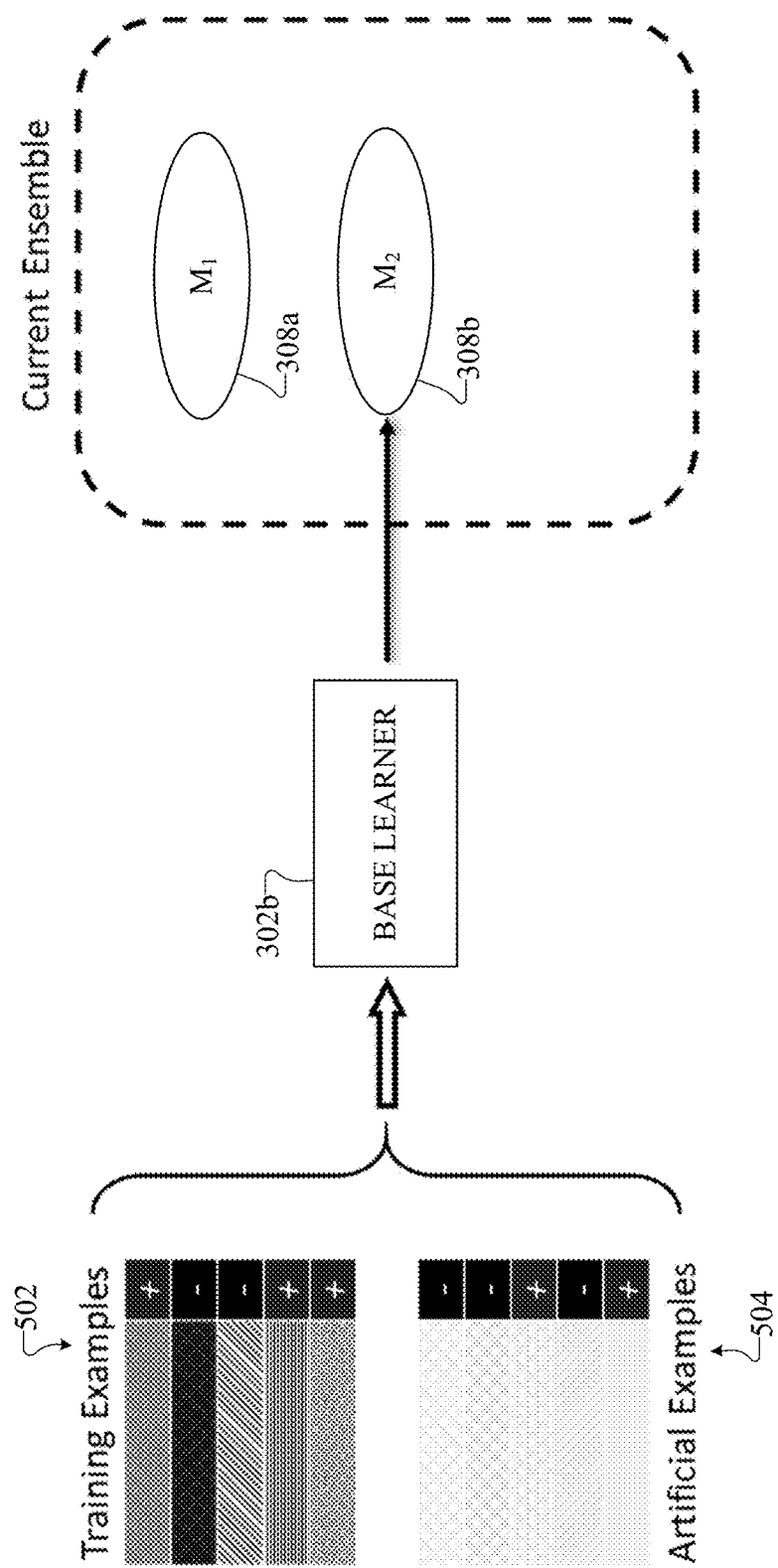
Figure 5C:
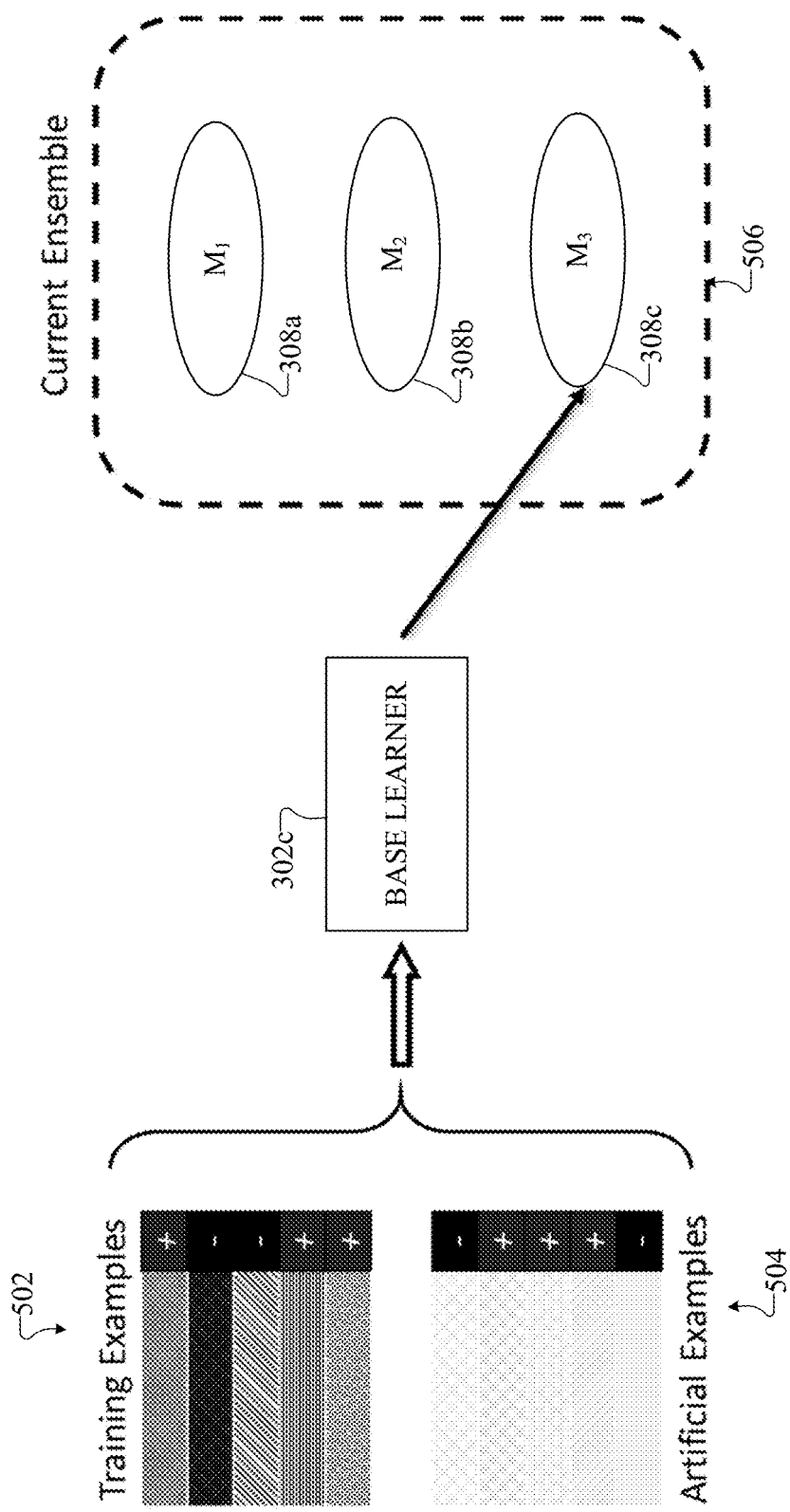

FIGS. 5A, 5B, and 5C illustrate a portion of a specific example training process for training a multi-layered machine learning system in accordance with this disclosure. In particular, FIGS. 5A, 5B, and 5C illustrate one specific way in which a single group of base models can be generated sequentially. As shown in FIG. 5A, the base learner 302a receives training data from a set 502 of training data (which could represent part of the training data 306 or the subset 306a in FIG. 3). The "+" and "−" symbols in FIG. 5A identify which training patterns in the set 502 are used by the base learner 302a in this example. As noted above, the base learner 302a generates the model $M_1$ first, so the model $M_1$ is not based on the uncertainty associated with any other models.

As shown in FIG. 5B, once the first model $M_1$ is generated, the base learner 302b can receive the same training data from the set 502 of training data, plus certain training examples from an artificially-created training set 504. The "+" and "−" symbols in FIG. 5B identify which training patterns in the sets 502 and 504 are used by the base learner 302b in this example. The base learner 302b uses this data to generate another base model 308b.

As shown in FIG. 5C, once the second model $M_2$ is generated, the base learner 302c can receive the same training data from the set 502 of training data, plus a different collection of training examples from the artificially-created training set 504. The base learner 302c uses this data to generate another base model 308c. The three base models 308a-308c here can be said to represent one group 506 of base models.

In this example, the three base models 308a-308c are not necessarily complementary with one another to the largest extent possible since they are generated using the same training data from the set 502 of training data. However, the base models 308a-308c can still be generated using base learners 302a-302c that support different machine learning techniques. Moreover, as noted above, it is not necessary that all base models 308a-308n complement one another individually. Rather, it is also possible for a group of base models (such as the group 506) to be complementary to one or more other groups of base models. Thus, for example, the technique shown in FIGS. 5A, 5B, and 5C could be repeated using different examples from the sets 502 and 504 or using different training and artificial examples from other sets with other base learners to generate one or more other groups of base models. The different groups of base models can be designed so that the groups of models are complementary to each other.

Although FIGS. 5A, 5B, and 5C illustrate one portion of a specific example training process for training a multi-layered machine learning system, various changes may be made to FIGS. 5A, 5B, and 5C. For example, as described above, it is not necessary to generate groups of base models in this manner. In other embodiments, for instance, each base model 308a-308n could be generated using its own training data examples selected in the various ways described above.

Figure 6:
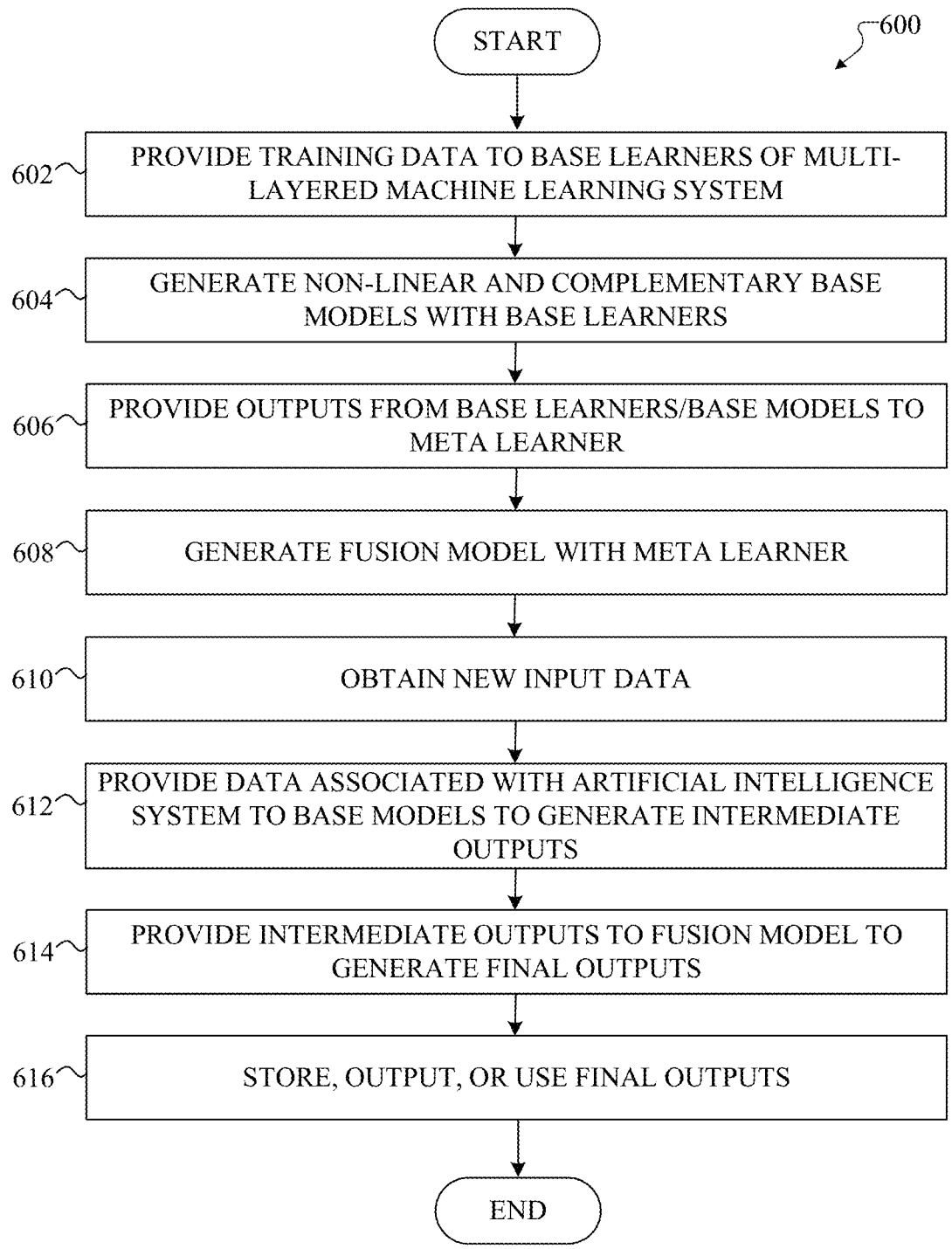
FIG. 6 illustrates an example method for training and using a multi-layered machine learning system in accordance with this disclosure.

FIG. 6 illustrates an example method 600 for training and using a multi-layered machine learning system in accordance with this disclosure. For ease of explanation, the method 600 may be described as being performed using the base learners 302a-302n and meta learner 304 in the training process 300 and the execution or inferencing process 400 of FIGS. 3 and 4, which could be implemented using one or more electronic devices (such as an electronic device 101, 102, or 104 or server 106) in FIG. 1. However, the method 600 may be performed using any suitable device(s) that operate in any suitable system(s).

As shown in FIG. 6, training data is provided to base learners of a multi-layered machine learning system at step 602, and non-linear and complementary base models are generated with the base learners at step 604. This could include, for example, at least one of the electronic devices (such as the electronic device 101, 102, or 104 or server 106) executing the base classification algorithms of the base learners 302a-302n to sequentially generate the base models 308a-308n. This could also include at least one of the electronic devices selecting the training data for each of the base learners 302b-302n using one of the techniques described above so that each base model 308b-308n is trained based on the uncertainty associated with the previously-generated base model(s).

Outputs from the base learners or base models are provided to a meta learner at step 606, and a fusion model is generated with the meta learner at step 608. This could include, for example, at least one of the electronic devices executing the meta classification algorithm of the meta learner 304 to generate the fusion model 310. This could also include at least one of the electronic devices providing test datasets to the base models 308a-308n in order to estimate goodness factors for the base models 308a-308n, which can be used in some embodiments by the fusion model 310 to combine outputs from the base models 308a-308n.

New input data is obtained at step 610. This could include, for example, at least one of the electronic devices receiving unlabeled real-use data associated with a commercially-deployed artificial intelligence system or other unlabeled data. The new input data is provided to the base models to generate intermediate output values at step 612. This could include, for example, at least one of the electronic devices providing unlabeled input data 402 to the base models 308a-308n, which generate intermediate outputs 404a-404n. The intermediate outputs are provided to the fusion model to generate one or more final output values at step 614. This could include, for example, at least one of the electronic devices providing the intermediate outputs 404a-404n to the fusion model 310, which generates the final outputs 406.

The one or more final output values are stored, output, or used in some manner at step 616. This could include, for example, at least one of the electronic devices using the final output values as labels for the input data 402 so that the labeled input data can be used during retraining of the commercially-deployed artificial intelligence system or other system. Note, however, that the labeled data could be used in any other suitable manner.

Although FIG. 6 illustrates one example of a method 600 for training and using a multi-layered machine learning system, various changes may be made to FIG. 6. For example, while shown as a series of steps, various steps in FIG. 6 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
training a plurality of base classification algorithms in a multi-layered machine learning system using training data to generate a plurality of base models, wherein training the base classification algorithms comprises using different training data or different machine learning techniques to specialize different base models differently such that the different base models are non-linear and complementary to one another, and wherein each of the base models is generated using a different one of the base classification algorithms;
generating a fusion model using a meta classification algorithm in the multi-layered machine learning system, the meta classification algorithm using goodness factors associated with the base models to generate the fusion model, the goodness factors identifying average performances of the base models;
providing input data to the base models to generate a plurality of intermediate outputs, each intermediate output comprising a base prediction; and
processing the intermediate outputs using the fusion model to generate a final output associated with the input data, wherein the fusion model normalizes the intermediate outputs using the goodness factors associated with the base models.

2. The method of claim 1, further comprising:
training the meta classification algorithm using outputs from the base classification algorithms or the base models based on the training data to generate the fusion model.

3. The method of claim 1, wherein training the base classification algorithms comprises training each of the base classification algorithms using samples of training data that do not carry an equal amount of information as the other base classification algorithms.

4. The method of claim 1, wherein the training data used by each of at least one of the base classification algorithms is selected based on an uncertainty associated with at least one other of the base classification algorithms.

5. The method of claim 4, wherein the training data used by a specific one of the base classification algorithms is selected based on a least-confident strategy comprising:

$$x^* = \arg\max_{x,M}(1 - P_M(\tilde{y}|x))$$

where x represents a set of training data, x* represents samples of the training data from the set to be used by the specific base classification algorithm, M represents the base model associated with the specific base classification algorithm, $\tilde{y}$ represents a probable output for the training data x over the base model M, and P represents a probability function.

6. The method of claim 4, wherein the training data used by a specific one of the base classification algorithms is selected based on a least-reliable strategy comprising:

$$x^* = \arg\min_{x,M}(P_M(\tilde{y}_2|x) - P_M(\tilde{y}_1|x))$$

where x represents a set of training data, x* represents samples of the training data from the set to be used by the specific base classification algorithm, M represents the base model associated with the specific base classification algorithm, $\tilde{y}_1$ and $\tilde{y}_2$ represent two probable outputs for the training data x over the base model M, and P represents a probability function.

7. The method of claim 4, wherein the training data used by a specific one of the base classification algorithms is selected based on a most output entropy strategy comprising:

$$x^* = \operatorname*{argmax}_{x,M}(P_M(\tilde{y}|x))\log P_M(\tilde{y}|x))$$

where x represents a set of training data, x* represents samples of the training data from the set to be used by the specific base classification algorithm, M represents the base model associated with the specific base classification algorithm, ỹ represents a probable output for the training data x over the base model M, and P represents a probability function.

8. An electronic device comprising:
at least one memory; and
at least one processor coupled to the at least one memory, the at least one processor configured to:
train a plurality of base classification algorithms in a multi-layered machine learning system using training data to generate a plurality of base models, wherein, to train the base classification algorithms, the at least one processor is configured to use different training data or different machine learning techniques to specialize different base models differently such that the different base models are non-linear and complementary to one another, and wherein each of the base models is generated using a different one of the base classification algorithms;
generate a fusion model using a meta classification algorithm in the multi-layered machine learning system, the meta classification algorithm configured to use goodness factors associated with the base models to generate the fusion model, the goodness factors identifying average performances of the base models;
process input data using the base models to generate a plurality of intermediate outputs, each intermediate output comprising a base prediction; and
process the intermediate outputs using the fusion model to generate a final output associated with the input data, wherein the fusion model is configured to normalize the intermediate outputs using the goodness factors associated with the base models.

9. The electronic device of claim 8, wherein the at least one processor is further configured to implement the multi-layered machine learning system to train the meta classification algorithm using outputs from the base classification algorithms or the base models based on the training data to generate the fusion model.

10. The electronic device of claim 8, wherein, to train the base classification algorithms, the at least one processor is configured to train each of the base classification algorithms using samples of training data that do not carry an equal amount of information as the other base classification algorithms.

11. The electronic device of claim 8, wherein, to train the base classification algorithms, the at least one processor is configured to select the training data used by each of at least one of the base classification algorithms based on an uncertainty associated with at least one other of the base classification algorithms.

12. The electronic device of claim 11, wherein, to train the base classification algorithms, the at least one processor is configured to select the training data used by a specific one of the base classification algorithms based on a least-confident strategy comprising:

$$x^* = \arg\max_{x,M}(1-P_M(\tilde{y}|x))$$

where x represents a set of training data, x* represents samples of the training data from the set to be used by the specific base classification algorithm, M represents the base model associated with the specific base classification algorithm, ỹ represents a probable output for the training data x over the base model M, and P represents a probability function.

13. The electronic device of claim 11, wherein, to train the base classification algorithms, the at least one processor is configured to select the training data used by a specific one of the base classification algorithms based on a least-reliable strategy comprising:

$$x^* = \arg\min_{x,M}(P_M(\tilde{y}_2|x)-P_M(\tilde{y}_1|x))$$

where x represents a set of training data, x* represents samples of the training data from the set to be used by the specific base classification algorithm, M represents the base model associated with the specific base classification algorithm, $\tilde{y}_1$ and $\tilde{y}_2$ represent two probable outputs for the training data x over the base model M, and P represents a probability function.

14. The electronic device of claim 11, wherein, to train the base classification algorithms, the at least one processor is configured to select the training data used by a specific one of the base classification algorithms based on a most output entropy strategy comprising:

$$x^* = \underset{x,M}{\operatorname{argmax}}(P_M(\tilde{y}|x))\log P_M(\tilde{y}|x))$$

where x represents a set of training data, x* represents samples of the training data from the set to be used by the specific base classification algorithm, M represents the base model associated with the specific base classification algorithm, ỹ represents a probable output for the training data x over the base model M, and P represents a probability function.

15. A non-transitory computer readable medium containing computer readable program code that, when executed, causes an electronic device to:
train a plurality of base classification algorithms in a multi-layered machine learning system using training data to generate a plurality of base models, wherein the computer readable program code that when executed cause the electronic device to train the base classification algorithms comprise computer readable program code that when executed cause the electronic device to use different training data or different machine learning techniques to specialize different base models differently such that the different base models are non-linear and complementary to one another, and wherein each of the base models is generated using a different one of the base classification algorithms;
generate a fusion model using a meta classification algorithm in the multi-layered machine learning system, the meta classification algorithm configured to use goodness factors associated with the base models to generate the fusion model, the goodness factors identifying average performances of the base models;
process input data using the base models to generate a plurality of intermediate outputs, each intermediate output comprising a base prediction; and
process the intermediate outputs using the fusion model to generate a final output associated with the input data, wherein the fusion model is configured to normalize the intermediate outputs using the goodness factors associated with the base models.

16. The non-transitory computer readable medium of claim 15, further containing computer readable program code that, when executed, causes the electronic device to train the meta classification algorithm using outputs from the base classification algorithms or the base models based on the training data to generate the fusion model.

17. The non-transitory computer readable medium of claim 15, wherein the computer readable program code that when executed causes the electronic device to train the base classification algorithms comprises:
  computer readable program code that when executed causes the electronic device to:
    train each of the base classification algorithms using samples of training data that do not carry an equal amount of information as the other base classification algorithms; and
    select the training data used by each of at least one of the base classification algorithms based on an uncertainty associated with at least one other of the base classification algorithms.

18. The non-transitory computer readable medium of claim 17, wherein the computer readable program code that when executed causes the electronic device to train the base classification algorithms comprises:
  computer readable program code that when executed causes the electronic device to select the training data used by a specific one of the base classification algorithms based on a least-confident strategy comprising:

$$x^* = \arg\max_{x,M}(1 - P_M(\tilde{y}|x))$$

where x represents a set of training data, x* represents samples of the training data from the set to be used by the specific base classification algorithm, M represents the base model associated with the specific base classification algorithm, $\tilde{y}$ represents a probable output for the training data x over the base model M, and P represents a probability function.

19. The non-transitory computer readable medium of claim 17, wherein the computer readable program code that when executed causes the electronic device to train the base classification algorithms comprises:
  computer readable program code that when executed causes the electronic device to select the training data used by a specific one of the base classification algorithms based on a least-reliable strategy comprising:

$$x^* = \arg\min_{x,M}(P_M(\tilde{y}_2|x) - P_M(\tilde{y}_1|x))$$

where x represents a set of training data, x* represents samples of the training data from the set to be used by the specific base classification algorithm, M represents the base model associated with the specific base classification algorithm, $\tilde{y}_1$ and $\tilde{y}_2$ represent two probable outputs for the training data x over the base model M, and P represents a probability function.

20. The non-transitory computer readable medium of claim 17, wherein the computer readable program code that when executed causes the electronic device to train the base classification algorithms comprises:
  computer readable program code that when executed causes the electronic device to select the training data used by a specific one of the base classification algorithms based on a most output entropy strategy comprising:

$$x^* = \underset{x,M}{\operatorname{argmin}}(P_M(\tilde{y}|x)\log P_M(\tilde{y}|x))$$

where x represents a set of training data, x* represents samples of the training data from the set to be used by the specific base classification algorithm, M represents the base model associated with the specific base classification algorithm, *$\tilde{y}$ represents a probable output for the training data x over the base model M, and P represents a probability function.*

\* \* \* \* \*